(12) United States Patent
Konyuba et al.

(10) Patent No.: US 12,253,445 B2
(45) Date of Patent: Mar. 18, 2025

(54) SPECIMEN PRETREATMENT METHOD

(71) Applicant: JEOL Ltd., Tokyo (JP)

(72) Inventors: Yuji Konyuba, Tokyo (JP); Tomohiro Haruta, Tokyo (JP); Yuta Ikeda, Tokyo (JP); Tomohisa Fukuda, Tokyo (JP)

(73) Assignee: JEOL Ltd., Tokyo (JP)

( * ) Notice: Subject to any disclaimer, the term of this patent is extended or adjusted under 35 U.S.C. 154(b) by 323 days.

(21) Appl. No.: 17/550,002

(22) Filed: Dec. 14, 2021

(65) Prior Publication Data

US 2022/0214250 A1  Jul. 7, 2022

(30) Foreign Application Priority Data

Jan. 7, 2021 (JP) .................................. 2021-001504

(51) Int. Cl.
*G01N 1/28* (2006.01)
*G01N 1/06* (2006.01)

(52) U.S. Cl.
CPC .............. *G01N 1/2813* (2013.01); *G01N 1/06* (2013.01)

(58) Field of Classification Search
CPC .. G01N 1/2813; G01N 1/06; G01N 2001/282; G01N 2001/2833; G01N 1/02; G01N 1/08; G01N 1/286; G01N 1/36; G01N 2223/419; G01N 23/04; G01N 23/046; G01N 23/20025; G01N 2001/208; G01N 23/2202; B01L 3/505; B01L 3/06; C23C 14/14; G02B 21/34; G02B 21/26; G02B 21/367; G21K 5/08; H01J 37/20; H01J 2237/20292; H01J 37/28;
(Continued)

(56) References Cited

U.S. PATENT DOCUMENTS

| 4,144,760 A | * | 3/1979 | Schlueter | A61B 10/02 |
| | | | | 73/864.71 |
| 6,003,419 A | * | 12/1999 | Irita | C12M 45/02 |
| | | | | 83/13 |

(Continued)

FOREIGN PATENT DOCUMENTS

| JP | S5343590 A | 4/1978 |
| JP | 61239140 A | * 10/1986 |

(Continued)

OTHER PUBLICATIONS

Konyuba, Yuji et al. "Fabrication and characterization of sample-supporting film made of silicon nitride for large-area observation in transmission electron microscopy." Microscopy 67 6 (2018): 367-370. (Year: 2018).*

(Continued)

*Primary Examiner* — Daniel R Miller
*Assistant Examiner* — Eric Sebastian Von Wald
(74) *Attorney, Agent, or Firm* — The Webb Law Firm

(57) ABSTRACT

A specimen pretreatment method for transferring a specimen supported by a first specimen supporting tool to a second specimen supporting tool, the specimen pretreatment method including: transferring a specimen supported by the first specimen supporting tool to a film; immersing the film and the specimen on the film in a liquid to dissolve the film; and recovering the specimen from the liquid and supporting the specimen with the second specimen supporting tool.

6 Claims, 10 Drawing Sheets

(58) Field of Classification Search
CPC ......... H01J 2237/20; H01J 2237/31749; H01J 2237/26; H01J 2237/2611; H01J 2237/2813
See application file for complete search history.

(56) References Cited

U.S. PATENT DOCUMENTS

| | | | | |
|---|---|---|---|---|
| 2009/0065708 A1* | 3/2009 | Moon | ............. | H01J 37/26 |
| | | | | 250/526 |
| 2010/0132483 A1* | 6/2010 | Thorne | ............. | G01N 1/286 |
| | | | | 73/863 |
| 2015/0259785 A1 | 9/2015 | Konyuba | | |
| 2016/0024559 A1* | 1/2016 | Sangha | ............. | G01N 1/405 |
| | | | | 422/547 |
| 2021/0102871 A1* | 4/2021 | Gupta | ............. | G01N 1/36 |

FOREIGN PATENT DOCUMENTS

| | | | | | |
|---|---|---|---|---|---|
| JP | S61239140 A | | 10/1986 | | |
| JP | 62185143 A | * | 8/1987 | | |
| JP | S62185143 A | | 8/1987 | | |
| JP | 2015187974 A | * | 10/2015 | ............. | C23C 14/14 |
| JP | 2022074991 A | * | 5/2022 | ............. | G01N 1/06 |

OTHER PUBLICATIONS

Office Action issued in JP2021001504 on Dec. 6, 2022.

\* cited by examiner

SPECIMEN PRETREATMENT METHOD

CROSS-REFERENCE TO RELATED APPLICATION

This application claims priority to Japanese patent application No. 2021-001504 filed Jan. 7, 2021, the disclosure of which is hereby incorporated by reference in its entirety.

BACKGROUND OF THE INVENTION

Field of the Invention

The present invention relates to a specimen pretreatment method.

Description of Related Art

A section prepared using an ultramicrotome is spread on the surface of distilled water filled in a knife boat. The section spread on the water surface is scooped by a specimen supporting tool such as a mesh grid and supported by the mesh grid. The section supported by the mesh grid can be observed with a scanning electron microscope, a transmission electron microscope, or the like.

For example, JP-A-2015-187974 discloses a specimen supporting tool including a silicon substrate and a supporting film formed at an opening of the silicon substrate. The supporting film for supporting a specimen is, for example, a silicon nitride film, a carbon film, or the like.

Since the specimen supporting tool disclosed in JP-A-2015-187974 can increase the area of the supporting film, a continuous section in which a plurality of sections are connected can be supported. However, such a specimen supporting tool has a larger thickness than a commonly used mesh grid or the like. For this reason, when a specimen is observed with a large inclination in an electron microscope, the specimen may be behind the substrate. Therefore, it is desirable to use a mesh grid when observing the specimen with a large inclination. As described above, it is necessary to use a specimen supporting tool suitable for the purpose of observation.

However, since specimens for electron microscopy such as sections prepared by a microtome are extremely fragile, it is difficult to transfer the specimen between two specimen supporting tools when observing the same specimen for different observation purposes.

SUMMARY OF THE INVENTION

According to an aspect of the invention, there is provided a specimen pretreatment method for transferring a specimen supported by a first specimen supporting tool to a second specimen supporting tool, the specimen pretreatment method comprising:
  transferring a specimen supported by the first specimen supporting tool to a film;
  immersing the film and the specimen on the film in a liquid to dissolve the film; and
  recovering the specimen from the liquid and supporting the specimen with the second specimen supporting tool.

DESCRIPTION OF THE INVENTION

According to an embodiment of the invention, there is provided a specimen pretreatment method for transferring a specimen supported by a first specimen supporting tool to a second specimen supporting tool, the specimen pretreatment method comprising:
  transferring a specimen supported by the first specimen supporting tool to a film;
  immersing the film and the specimen on the film in a liquid to dissolve the film; and
  recovering the specimen from the liquid and supporting the specimen with the second specimen supporting tool.

With such a specimen pretreatment method, a specimen can be easily transferred from the first specimen supporting tool to the second specimen supporting tool. In addition, such a specimen pretreatment method can reduce deformation of the specimen and deterioration of image quality when the specimen is observed with an electron microscope.

Hereinafter, preferred embodiments of the invention will be described in detail with reference to the drawings. It is noted that the following embodiments do not unduly limit the scope of the invention as stated in the claims. Moreover, all of the components described below are not necessarily essential requirements of the invention.

1. Specimen Pretreatment Method

1.1. First Specimen Support

First, a specimen pretreatment method according to an embodiment of the invention will be described with reference to the drawings.

Figure 1:
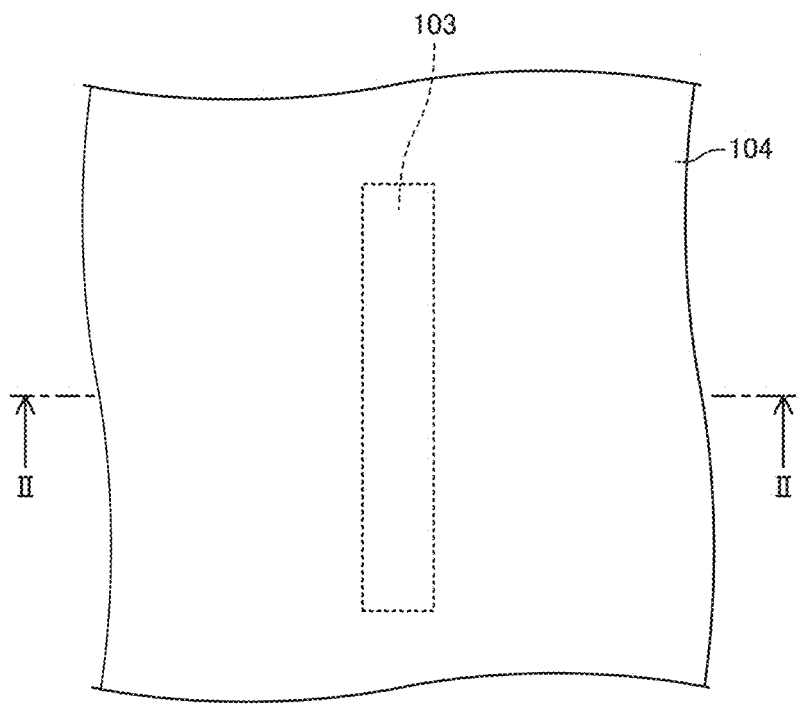
FIG. 1 is a plan view schematically illustrating the first specimen supporting tool.
Figure 2:
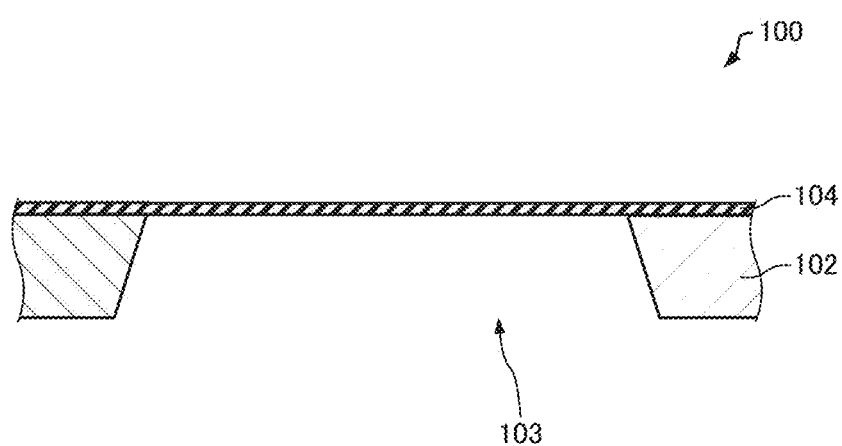
FIG. 2 is a cross-sectional view schematically illustrating the first specimen supporting tool.

FIG. 1 is a plan view schematically illustrating a first specimen supporting tool 100. FIG. 2 is a cross-sectional view schematically illustrating the first specimen supporting tool 100. FIG. 2 is a cross-sectional view taken along the line II-II of FIG. 1.

As illustrated in FIGS. 1 and 2, the first specimen supporting tool 100 includes a substrate 102 and a supporting film 104.

The substrate 102 is a semiconductor substrate such as a silicon substrate. The substrate 102 may be exemplified by a variety of substrates such as a ceramic substrate, a glass substrate, a sapphire substrate, a synthetic resin substrate, and the like. The thickness of the substrate 102 is, for example, about several hundred micrometers. The substrate 102 is formed with an opening 103 that penetrates the substrate 102. The opening 103 is for passing an electron beam in a transmission electron microscope. The planar shape of the opening 103 is, for example, a rectangle having a short side of about 1 mm and a long side of about 2 mm.

The supporting film 104 is, for example, a silicon nitride film. The supporting film 104 may be a formvar film, a carbon film, a graphene film, or the like. The region of the supporting film 104 that overlaps with the opening 103 serves as a region for supporting the specimen.

Figure 3:
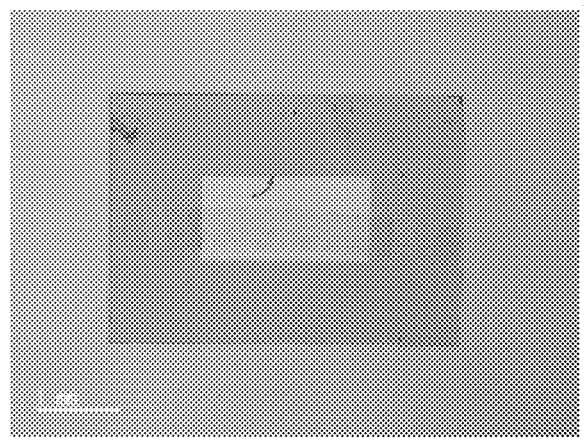
FIG. 3 is an optical micrograph illustrating the first specimen supporting tool supporting a continuous section.

FIG. 3 is an optical micrograph illustrating the first specimen supporting tool 100 supporting a continuous section.

As illustrated in FIG. 3, in the first specimen supporting tool 100, since the supporting film 104 having a relatively large area can be formed flat, a continuous section can be supported. A continuous section is a series of a plurality of sections cut out continuously by a microtome. By observing each section constituting the continuous section with a transmission electron microscope or a scanning electron microscope, a continuous cross-sectional image (continuous cross-sectional image) can be acquired. By stacking the acquired continuous cross-sectional images, it is possible to perform three-dimensional reconstruction.

In a tomography method using continuous cross-sectional images in this way, the resolution in the X and Y directions depends on the resolution of the device used, but the resolution in the Z direction depends on the thickness of the section.

Here, a method in which a section is continuously tilted and observed with a transmission electron microscope to obtain a continuous tilt image (continuous tilt image), and the obtained continuous tilt image is used for three-dimensional reconstruction has been known as a tomography method. In the tomography method using this continuous tilt image, the resolution in the X, Y, and Z directions depends on the resolution of the device used. Therefore, the tomography method using the continuous tilt image can improve the resolution in the Z direction as compared with the tomography method using the continuous cross-sectional image.

By combining these two tomography methods, a three-dimensional structure of a specimen can be analyzed in more detail. For example, by combining these two tomography methods, it is possible to perform three-dimensional reconstruction of a specific protein in a cell after performing three-dimensional reconstruction of the entire cell. Specifically, after observing a continuous section, acquiring a continuous cross-sectional image and performing three-dimensional reconstruction of the entire cell, a continuous tilt image of one of a plurality of sections constituting the continuous section is acquired and then three-dimensional reconstruction of a specific protein in the cell is performed.

However, since the thickness of the substrate 102 of the first specimen supporting tool 100 is large, where the specimen is tilted, the specimen may be behind the substrate 102. Therefore, it is difficult to acquire a continuous tilt image with the first specimen supporting tool 100. If the specimen supported by the first specimen supporting tool 100 can be transferred to the second specimen supporting tool capable of acquiring a continuous tilt image, the two tomography methods can be combined.

Figure 4:
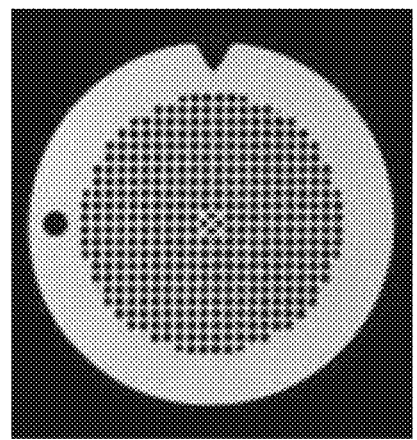
FIG. 4 is an optical micrograph illustrating an example of a mesh grid.

As the second specimen supporting tool, for example, a mesh grid for a transmission electron microscope can be used. FIG. 4 is an optical micrograph illustrating an example of a mesh grid for a transmission electron microscope.

The thickness of the mesh grid is about several tens of micrometers. As described above, a tool having a thickness smaller than that of the first specimen supporting tool is used as the second specimen supporting tool. As a result, even if the specimen is tilted, the specimen does not get behind the second specimen supporting tool, and a continuous tilt image can be acquired.

1.2. Flow of Pretreatment Method

Figure 5:
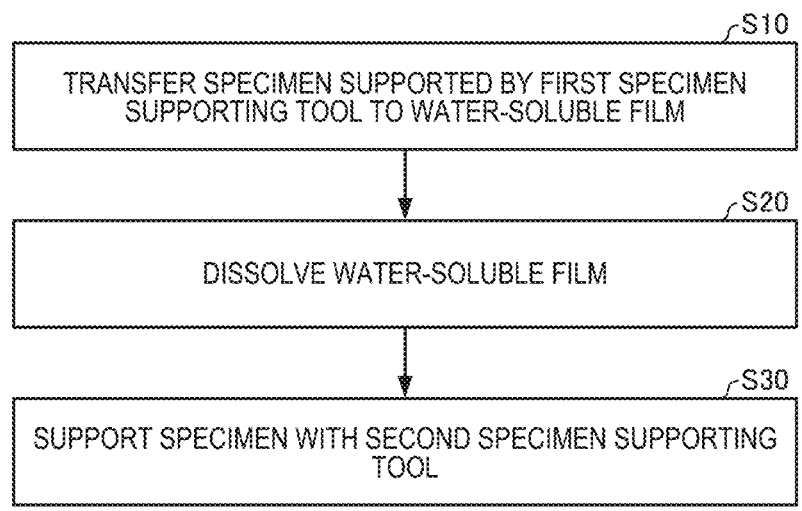
FIG. 5 is a flowchart illustrating an example of a specimen pretreatment method according to an embodiment of the invention.

FIG. 5 is a flowchart illustrating an example of a specimen pretreatment method according to an embodiment of the invention. FIGS. 6 to 12 are diagrams for explaining a specimen pretreatment method according to an embodiment of the invention.

1.2.1. Step S10 of Transferring a Section to a Water-Soluble Film

First, a specimen 2 supported by the supporting film 104 of the first specimen supporting tool 100 is transferred to a water-soluble film 10.

Figure 6:
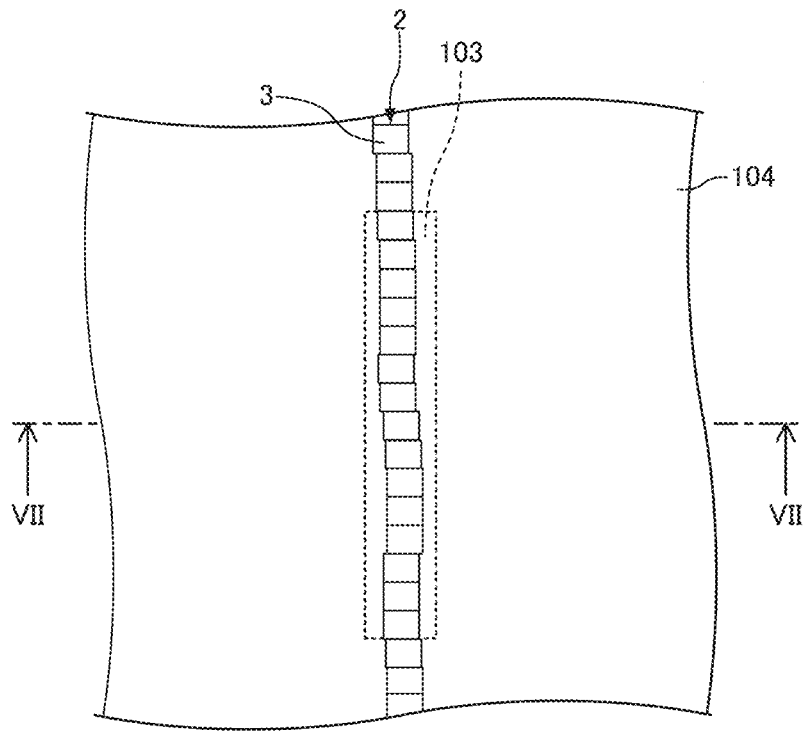
FIG. 6 is a diagram for explaining a specimen pretreatment method according to an embodiment of the invention.
Figure 7:
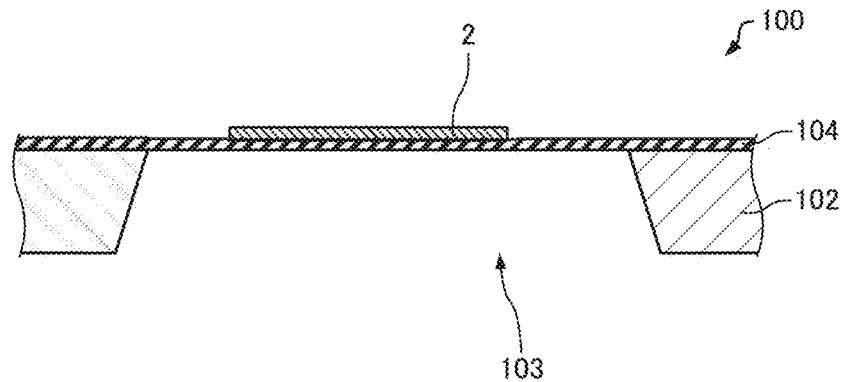
FIG. 7 is a diagram for explaining a specimen pretreatment method according to an embodiment of the invention.

First, as illustrated in FIGS. 6 and 7, the specimen 2 supported by the supporting film 104 of the first specimen supporting tool 100 is prepared. The specimen 2 is a continuous section and consists of a plurality of sections 3 continuously cut out by a microtome.

Figure 8:
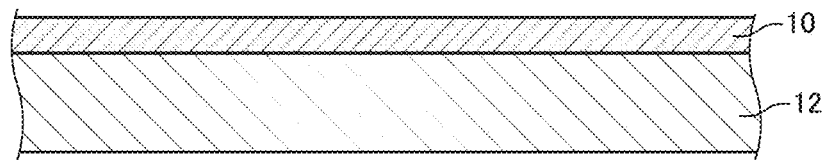
FIG. 8 is a diagram for explaining a specimen pretreatment method according to an embodiment of the invention.

Next, as illustrated in FIG. 8, the water-soluble film 10 is attached to a smooth substrate 12. The water-soluble film 10 is, for example, a polyvinyl alcohol film. Another water-soluble film may also be used as the water-soluble film 10. As the smooth substrate 12, a semiconductor substrate such as a silicon substrate can be used. For example, the water-soluble film 10 can be attached to the smooth substrate 12 using an adhesive tape or the like.

Figure 9:
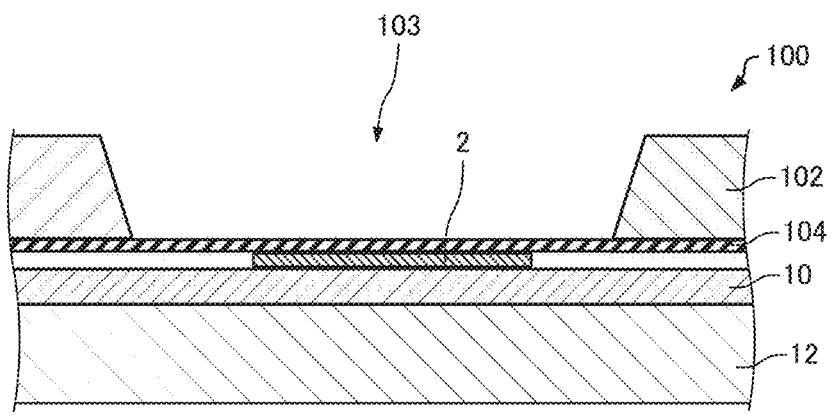
FIG. 9 is a diagram for explaining a specimen pretreatment method according to an embodiment of the invention.
Figure 10:
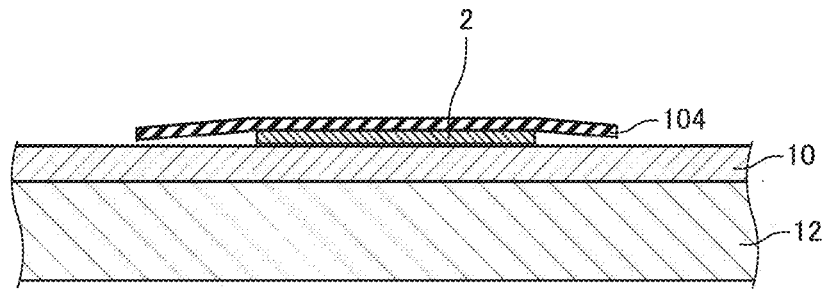
FIG. 10 is a diagram for explaining a specimen pretreatment method according to an embodiment of the invention.

Next, as illustrated in FIG. 9, the supporting film 104 of the first specimen supporting tool 100 and the specimen 2 on the supporting film 104 are brought into contact with the water-soluble film 10. Then, the substrate 102 is pushed. As a result, the supporting film 104 is separated from the substrate 102. Next, the substrate 102 is removed from the water-soluble film 10. As a result, as illustrated in FIG. 10, the specimen 2 can be transferred from the first specimen supporting tool 100 onto the water-soluble film 10. In this step, the specimen 2 is transferred from the first specimen supporting tool 100 onto the water-soluble film 10 with the supporting film 104 attached to the specimen 2.

In this step, the entire specimen 2 may be transferred from the first specimen supporting tool 100 onto the water-soluble film 10, or a part of the specimen 2 may be transferred. That is, all the sections constituting the continuous section may be transferred from the first specimen supporting tool 100 to the water-soluble film 10, or some of the plurality of sections constituting the continuous section may be transferred.

1.2.2. Step S20 of Dissolving the Water-Soluble Film

Figure 11:
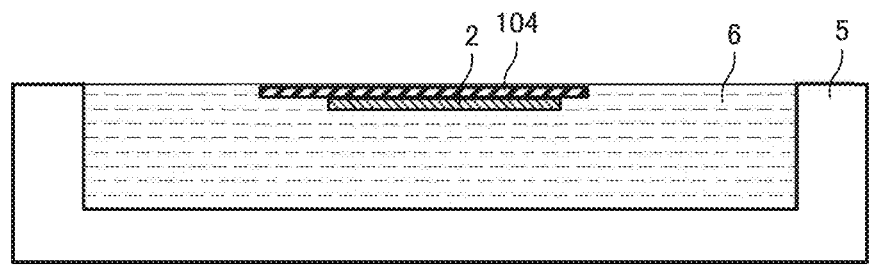
FIG. 11 is a diagram for explaining a specimen pretreatment method according to an embodiment of the invention.

Next, as illustrated in FIG. 11, the water-soluble film 10 and the specimen 2 on the water-soluble film 10 are immersed together with the smooth substrate 12 in a petri dish 5 containing pure water 6. As a result, the water-soluble film 10 is dissolved and the specimen 2 is peeled off. Then, the specimen 2 floats on the water surface of the pure water 6. As illustrated in FIG. 11, the supporting film 104 is attached to the specimen 2 in this step as well.

Here, the water-soluble film 10 is dissolved in pure water 6, but the liquid that dissolves the water-soluble film 10 is not limited to pure water 6, and may be distilled water, an aqueous solution, or the like.

Figure 12:
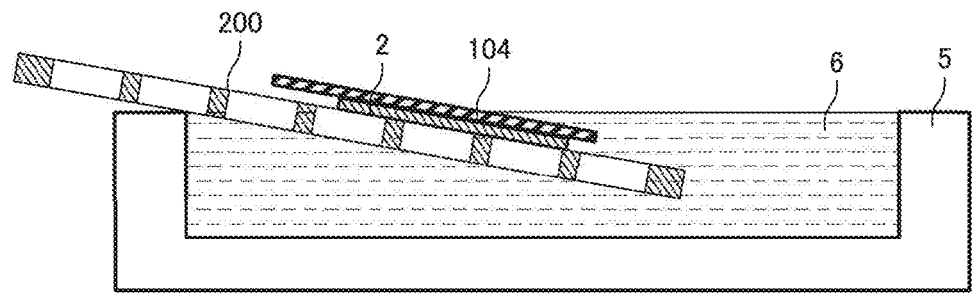
FIG. 12 is a diagram for explaining a specimen pretreatment method according to an embodiment of the invention.

1.2.3. Step S30 of Supporting the Continuous Section with the Second Specimen Supporting Tool As illustrated in FIG. 12, the specimen 2 floating on the water surface of the pure water 6 is recovered, and the specimen 2 is supported by the second specimen supporting tool 200.

The second specimen supporting tool 200 is, for example, a mesh grid, and the specimen 2 floating on the water surface of pure water 6 is scooped by the mesh grid. Then, the specimen 2 scooped by the second specimen supporting tool 200 is dried. As a result, the specimen 2 can be recovered from the water surface of the pure water 6, and the specimen 2 can be supported by the second specimen supporting tool 200.

In this step, the specimen 2 is supported by the second specimen supporting tool 200 with the supporting film 104 attached to the specimen 2. The supporting film 104 is attached to the specimen 2 from the time when the specimen 2 is transferred from the first specimen supporting tool 100 to the water-soluble film 10 until the specimen 2 is supported by the second specimen supporting tool 200.

The mesh grid used as the second specimen supporting tool 200 is a mesh grid for a transmission electron microscope. The mesh grid is a mesh-shaped (mesh-like) metal plate. The material of the mesh grid is, for example, a metal such as copper, stainless steel, molybdenum, platinum, or the like.

By the above steps, the specimen 2 can be transferred from the first specimen supporting tool 100 to the second specimen supporting tool 200.

2. Operational Effect

A specimen pretreatment method according to an embodiment of the invention includes the step S10 of transferring the specimen 2 supported by the first specimen supporting tool 100 to the water-soluble film 10, the step S20 of immersing the specimen 2 on the water-soluble film 10 and the water-soluble film 10 in pure water 6 to dissolve the water-soluble film 10, and the step S30 of recovering the specimen 2 from the pure water 6 and supporting the specimen 2 with the second specimen supporting tool 200. For this reason, the specimen 2 can be easily transferred from the first specimen supporting tool 100 to the second specimen supporting tool 200. Therefore, for example, the specimen 2 can be transferred from the first specimen supporting tool 100 including the substrate 102 and the supporting film 104 illustrated in FIG. 3 to the mesh grid (second specimen supporting tool 200) illustrated in FIG. 4.

As a result, a continuous cross-sectional image and a continuous tilt image of the same specimen 2 can be acquired. Therefore, for example, it is possible to perform three-dimensional reconstruction of the entire cell by a tomography method using a continuous cross-sectional image, and then perform three-dimensional reconstruction of a specific protein in the cell by a tomography method using a continuous tilt image.

Further, in the specimen pretreatment method according to the present embodiment, as illustrated in "4. Experimental Example" described later, it is possible to reduce the deformation of the specimen 2 and the deterioration of image quality when observing the specimen with an electron microscope.

Here, it is also conceivable to transfer the specimen 2, for example, by using a mesh grid equipped with a supporting film as the second specimen supporting tool 200 and bringing the specimen 2 supported by the first specimen supporting tool 100 into direct contact with the supporting film of the second specimen supporting tool 200. However, a thin formvar film or the like is used as the supporting film used for the specimen supporting tool so as not to interfere with the observation with a transmission electron microscope. Therefore, even if the specimen 2 supported by the first specimen supporting tool 100 is brought into direct contact with the supporting film of the second specimen supporting tool 200, the supporting film is broken and cannot support the specimen 2, or the supporting film is ruptured or wrinkled.

In the step S10 of transferring the specimen 2 to the water-soluble film 10, the specimen 2 is brought into contact with the water-soluble film 10 and the specimen 2 is transferred to the water-soluble film 10. Therefore, it is possible to reduce the deformation of the specimen 2 and the deterioration of image quality when observing the specimen with an electron microscope.

In the step S10 of transferring the specimen 2 to the water-soluble film 10, the specimen 2 is transferred to the water-soluble film 10 in a state where the supporting film 104 is attached to the specimen 2, and in the state S30 of supporting the specimen 2 with the second specimen supporting tool 200, the specimen 2 is supported by the second specimen supporting tool 200 with the supporting film 104 being attached to the specimen 2. In this way, the specimen 2 can be transferred from the first specimen supporting tool 100 to the second specimen supporting tool 200 with the supporting film 104 being attached to the specimen 2. In this way, in the specimen pretreatment method according to the present embodiment, since the specimen 2 is supported by the supporting film 104, the deformation of the specimen 2 can be reduced.

Further, the supporting film 104 is a silicon nitride film. Since the silicon nitride film is less likely to wrinkle and tear, it does not interfere with the observation of the specimen 2 even when the supporting film 104 is attached to the specimen 2.

In the step S30 of supporting the specimen 2 with the second specimen supporting tool 200, the specimen 2 floating on the pure water 6 is scooped with the second specimen supporting tool 200. Therefore, the specimen 2 can be easily supported by the second specimen supporting tool 200.

The specimen 2 supported by the first specimen supporting tool 100 is a continuous section in which a plurality of sections 3 continuously cut out by a microtome are connected, and in the step S30 in which the specimen 2 is supported by the second specimen supporting tool 200, the specimen 2 is supported, a part of the continuous section is recovered and a part of the continuous section is supported by the second specimen supporting tool 200. Therefore, after observing the continuous section supported by the first specimen supporting tool 100, acquiring a continuous cross-sectional image and performing three-dimensional reconstruction, the continuous section can be transferred from the first specimen supporting tool 100 to the second specimen supporting tool 200, a continuous tilt image of one section 3 of the plurality of sections 3 constituting the continuous section supported by the second specimen supporting tool 200 can be acquired, and three-dimensional reconstruction can be performed.

In the step S10 of transferring the specimen 2 to the water-soluble film 10, the substrate 102 is removed. Therefore, the specimen 2 can be supported by the second specimen supporting tool 200 in a state where the substrate 102 is removed.

In the specimen pretreatment method according to the present embodiment, the second specimen supporting tool 200 is a mesh grid, and the thickness of the mesh grid is smaller than the thickness of the substrate 102. Therefore, by transferring the specimen 2 to the second specimen supporting tool 200, even if the specimen 2 is greatly tilted, the specimen 2 does not get behind the second specimen supporting tool 200. Therefore, in the specimen pretreatment method according to the present embodiment, a continuous tilt image can be acquired.

3. Modification Example

In the above-described embodiment, the specimen 2 is transferred to the water-soluble film 10, but the film to which the specimen 2 is to be transferred is not limited to the water-soluble film. For example, the film to which the specimen 2 is to be transferred may be a film that is soluble in an organic solvent such as ethanol. In this case, in the step S20 of dissolving the film, the liquid for dissolving the film is an organic solvent, and the film and the specimen 2 on the film are immersed in the organic solvent.

In the above-described embodiment, the case where the first specimen supporting tool 100 includes the substrate 102 and the supporting film 104, and the second specimen supporting tool 200 is a mesh grid has been described, but such combination of the first specimen supporting tool 100 and the second specimen supporting tool 200 is not limiting.

4. Experimental Example

Figure 13:
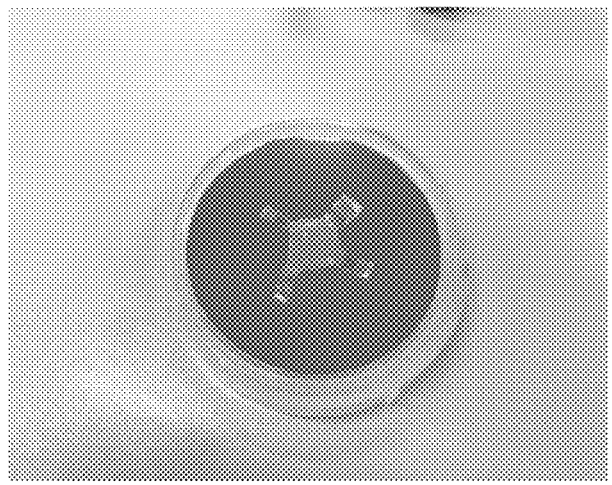
FIG. 13 is an optical micrograph for explaining a specimen pretreatment method.
Figure 14:
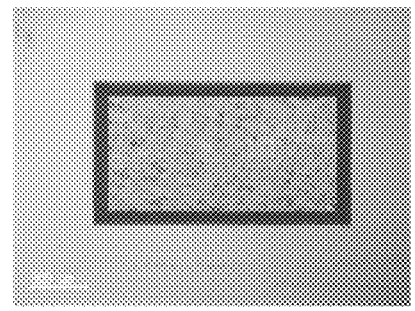
FIG. 14 is an optical micrograph for explaining a specimen pretreatment method.
Figure 15:
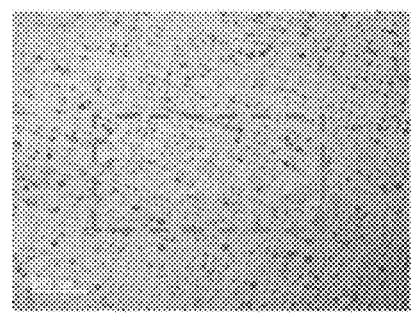
FIG. 15 is an optical micrograph for explaining a specimen pretreatment method.

An experimental example is shown below, and the invention will be described in more detail. The invention is not limited to the following experimental example.
4.1. Specimen Pretreatment
FIGS. 13 to 15 are optical micrographs for explaining a specimen pretreatment method. First, as illustrated in FIG. 13, a water-soluble film was attached to a smooth substrate. As the water-soluble film, a polyvinyl alcohol film (water-soluble poval film) having a thickness of 18 μm was used. A 2-inch silicon wafer was used as the smooth substrate. The thickness of the silicon wafer was set to 0.2 mm.

Next, a specimen supporting tool (hereinafter referred to as "SiN Window chip") in which a supporting film was a silicon nitride film, the size of the supporting film (that is, the size of the opening) was 1.0 mm×2.0 mm, and the thickness of the supporting film was 30 nm was prepared as the first specimen supporting tool. Then, the specimen was placed on the supporting film of the SiN Window chip. As a specimen, a continuous section having a section thickness of 70 nm, which was prepared by cutting a resin-embedded Paramecium with a microtome, was used.

Next, as illustrated in FIG. 14, the SiN Windows chip was placed on a smooth substrate to which a water-soluble film was attached, with the supporting film on the bottom and the substrate on the top.

Next, the substrate of the SiN Window chip was pressed with a finger to transfer the supporting film and the continuous section to the water-soluble film. Then, the substrate was removed. As a result, as illustrated in FIG. 15, the continuous section and the supporting film were placed on the water-soluble film.

Next, the water-soluble film and the continuous section and the supporting film on the water-soluble film were immersed together with the smooth substrate in a petri dish containing pure water. As a result, the water-soluble film was dissolved and the continuous section was peeled from the water-soluble film. The peeled-off continuous section floated on the water surface with the supporting film attached to the continuous section.

Next, the second specimen supporting tool was prepared. As the second specimen supporting tool, a Cu mesh grid having a thickness of 70 μm was used.

Next, the continuous section floating on the surface of the water was scooped with the mesh grid. Then, the continuous section scooped with the mesh grid was dried. Through the above steps, the continuous section was transferred from the SiN Window chip to the mesh grid.

The supporting film was attached to the continuous section from the transfer of the continuous section from the SiN Windows chip to the water-soluble film until the continuous section was supported by the mesh grid.

Figure 16:
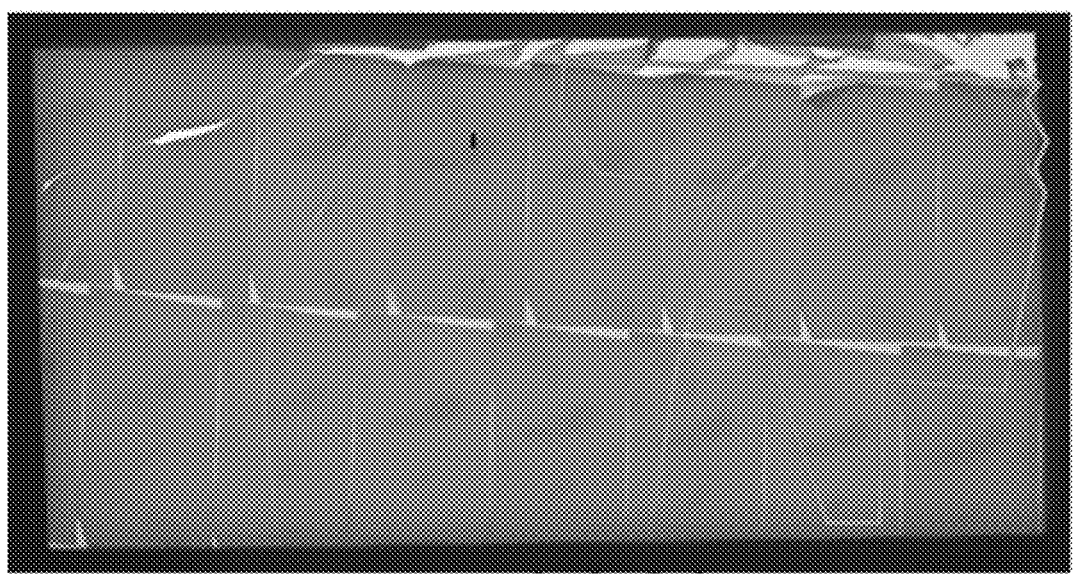
FIG. 16 is an optical micrograph of a continuous section on a supporting film before transferring to a mesh grid.
Figure 17:
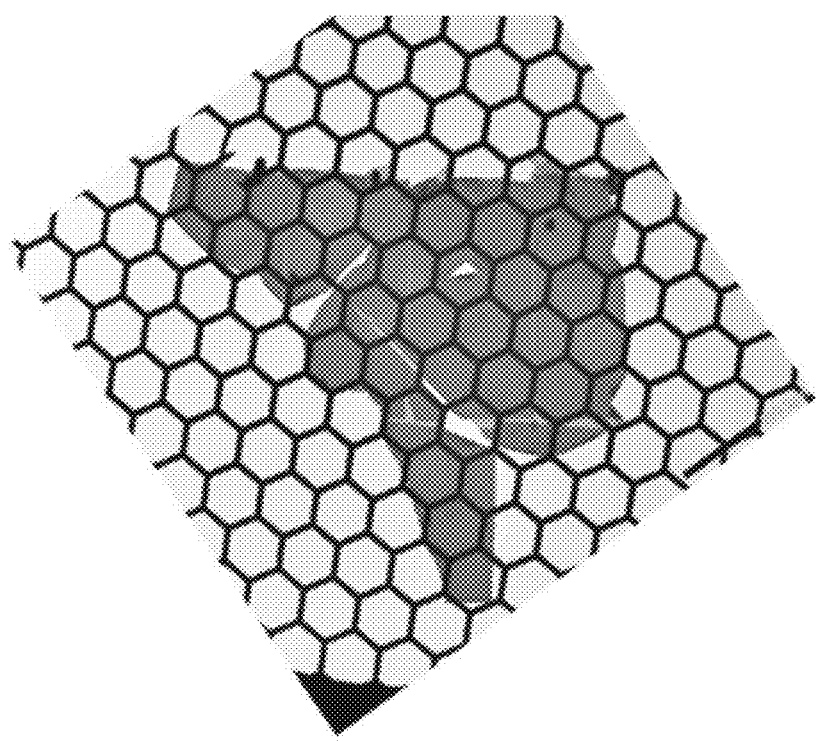
FIG. 17 is an optical micrograph of a continuous section after transferring to a mesh grid.

FIG. 16 is an optical micrograph of the continuous section before transferring to the mesh grid. FIG. 17 is an optical micrograph of continuous sections after transferring to a mesh grid.

As illustrated in FIGS. 16 and 17, the continuous section to which the supporting film was attached could be placed on the mesh grid. In FIG. 17, a part of the continuous section is placed on the mesh grid.

Through the above steps, the continuous section could be transferred from the SiN Window chip to the mesh grid.
4.2. Observation Results
Next, the section transferred from the SiN Window chip to the mesh grid by the above pretreatment method was observed with a transmission electron microscope. As a transmission electron microscope, JEM-1400 Flash manufactured by JEOL Ltd. was used. The observation was performed with the acceleration voltage set to 120 keV.

Figure 18:
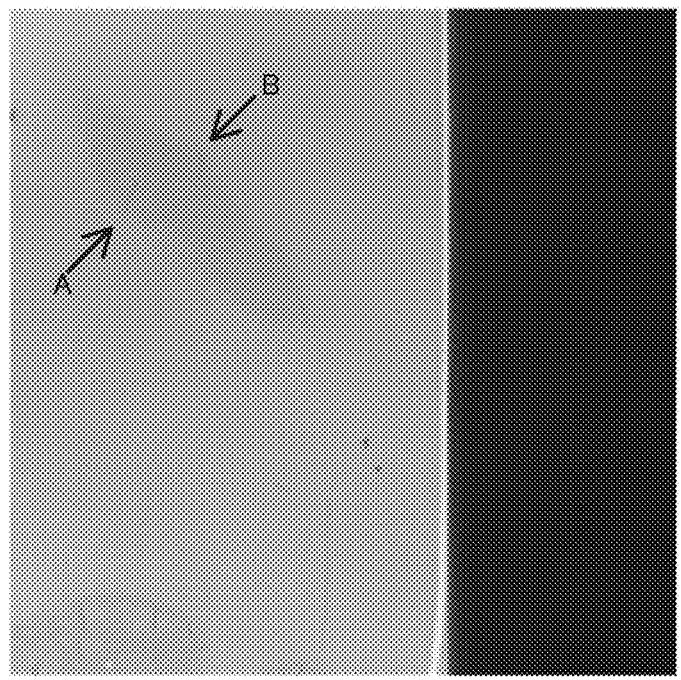
FIG. 18 is a transmission electron microscope image of a section supported by a SiN Window chip.
Figure 19:
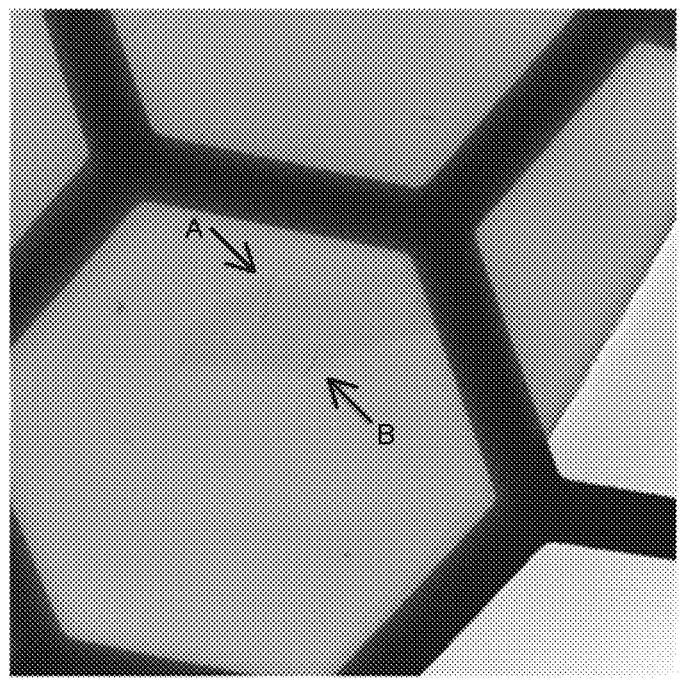
FIG. 19 is a transmission electron microscope image of a section transferred from a SiN Window chip to a mesh grid.

FIG. 18 is a transmission electron microscope image (TEM image) acquired by observing the section supported by a SiN Windows chip with a transmission electron microscope. FIG. 19 is a TEM image acquired by observing the section transferred from the SiN Windows chip to the mesh grid by the above pretreatment method with a transmission electron microscope. The TEM image of FIG. 18 is obtained by observing one of a plurality of sections constituting the continuous section. Further, the TEM image of FIG. 19 is obtained by observing the same section as the section of FIG. 18. The image of the same Paramecium is captured in the TEM image of FIG. 18 and the TEM image of FIG. 19.

In FIGS. 18 and 19, the lengths of cracks in Paramecium were compared. In FIGS. 18 and 19, two cracks (crack A and crack B) are included.

In the TEM image of FIG. 18, the length of the crack A was 97.880 pixel. Meanwhile, in the TEM image of FIG. 19, the length of the crack A was 97.268 pixel. Further, in the TEM image of FIG. 18, the length of the crack B was 83.267 pixel. Meanwhile, in the TEM image of FIG. 19, the length of the crack B was 83.156 pixel.

In this way, even when the sections were transferred from the SiN Window chip to the mesh grid, there was almost no change in the length of both crack A and crack B. Therefore, it was found that even when the sections were transferred from the SiN Window chip to the mesh grid by the above pretreatment method, there was almost no deformation of the sections.

Figure 20:
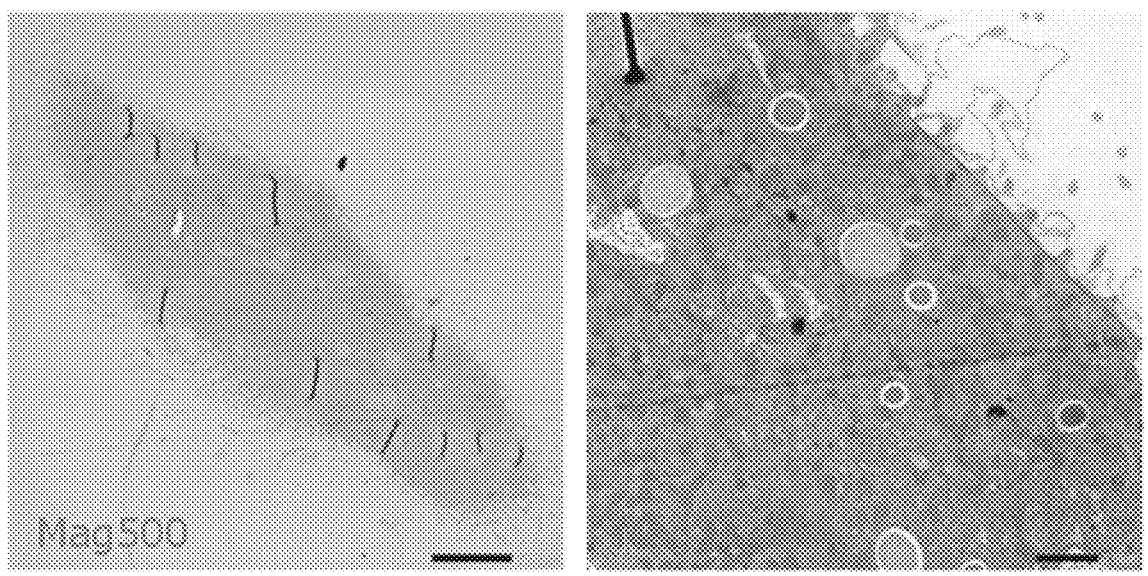
FIG. 20 is a transmission electron microscope image of a section supported by a SiN Window chip.
Figure 21:
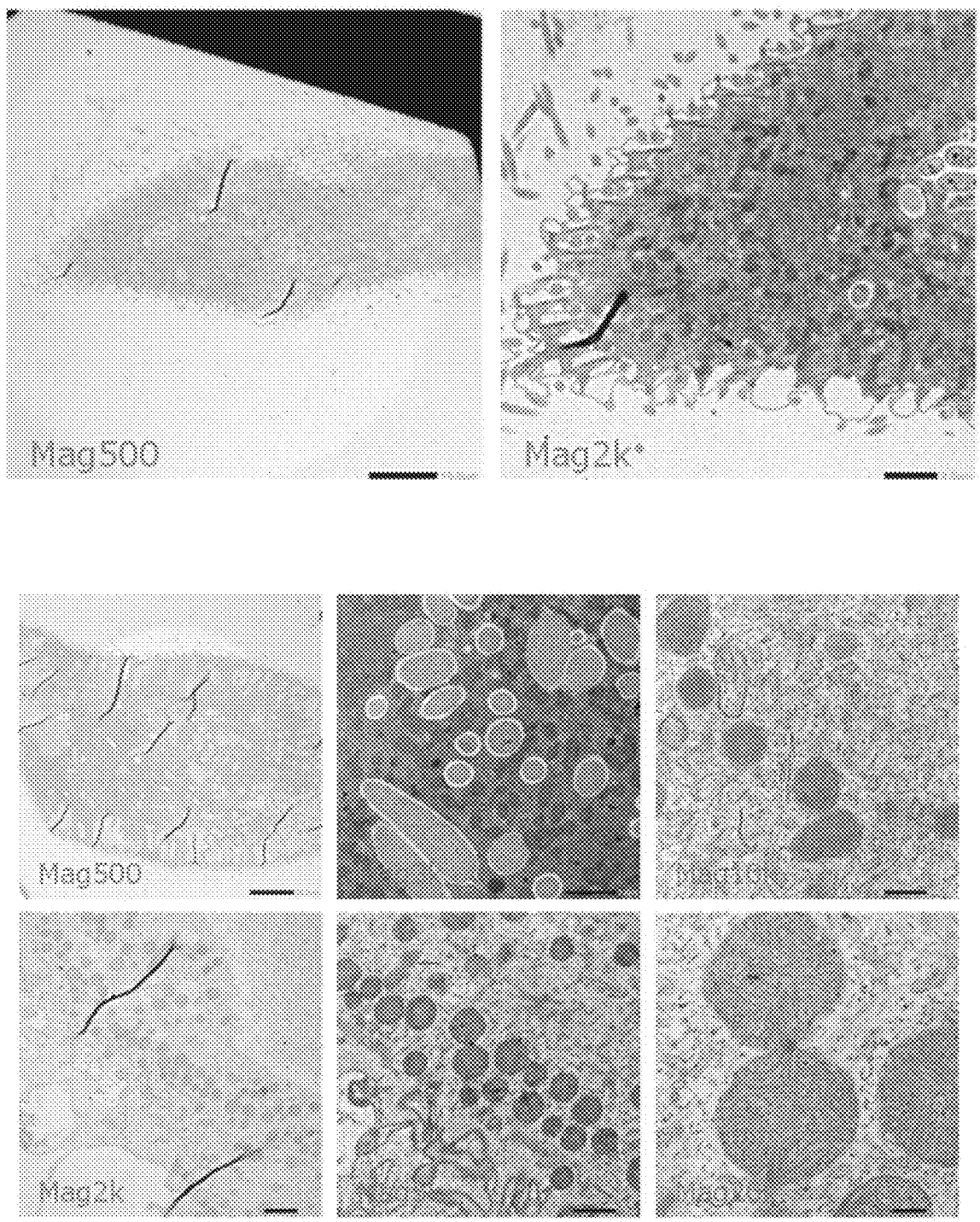
FIG. 21 is a transmission electron microscope image of a section transferred from a SiN Window chip to a mesh grid.

FIG. 20 is a TEM image acquired by observing a section supported by the SiN Window chip with a transmission electron microscope. FIG. 21 is a TEM image acquired by observing the section transferred from the SiN Windows chip to the mesh grid by the above pretreatment method with a transmission electron microscope. The TEM image of FIG. 20 is obtained by observing one of a plurality of sections constituting the continuous section. Further, the TEM image of FIG. 21 is obtained by observing the same section as the section of FIG. 20.

As illustrated in FIGS. 20 and 21, it was found that there was no deterioration in the image quality of the TEM image caused by the transfer of the section from the SiN Window chip to the mesh grid by the above pretreatment method.

The invention is not limited to the above-described embodiments, and various modifications can be made. For example, the invention includes configurations that are substantially the same as the configurations described in the embodiments. Substantially same configurations means configurations that are the same in function, method, and results, or configurations that are the same in objective and effects, for example. The invention also includes configurations in which non-essential elements described in the embodiments are replaced by other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

Some embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

What is claimed is:

1. A specimen pretreatment method for transferring a specimen supported by a first specimen supporting tool to a second specimen supporting tool, the specimen pretreatment method comprising:

transferring a specimen supported by the first specimen supporting tool to a film;

immersing the film and the specimen on the film in a liquid to dissolve the film; and recovering the specimen from the liquid and supporting the specimen with the second specimen supporting tool, wherein the first specimen supporting tool comprises a substrate having an opening and a supporting film having a region that overlaps the opening of the substrate for supporting the specimen;

in transferring the specimen to the film, the supporting film and the specimen on the supporting film are brought into contact with the film and the substrate is separated from the supporting film by pushing the substrate such that the specimen is transferred to the film in a state where the supporting film is attached to the specimen and the substrate is removed from the supporting film; and in supporting the specimen with the second specimen supporting tool, the specimen is supported by the second specimen supporting tool in a state where the supporting film is attached to the specimen.

2. The specimen pretreatment method according to claim 1, wherein the supporting film is a silicon nitride film.

3. The specimen pretreatment method according to claim 1, wherein in supporting the specimen with the second specimen supporting tool, the specimen floating on the liquid is scooped with the second specimen supporting tool.

4. The specimen pretreatment method according to claim 1, wherein the film is water-soluble, and the liquid is water or an aqueous solution.

5. The specimen pretreatment method according to claim 1, wherein the specimen supported by the first specimen supporting tool is a continuous section in which a plurality of sections continuously cut out by a microtome are connected; and in supporting the specimen with the second specimen supporting tool, a part of the continuous section is recovered and supported by the second specimen supporting tool.

6. The specimen pretreatment method according to claim 1, wherein the second specimen supporting tool is a mesh grid; and the thickness of the mesh grid is smaller than the thickness of the substrate.

\* \* \* \* \*